UNITED STATES PATENT OFFICE.

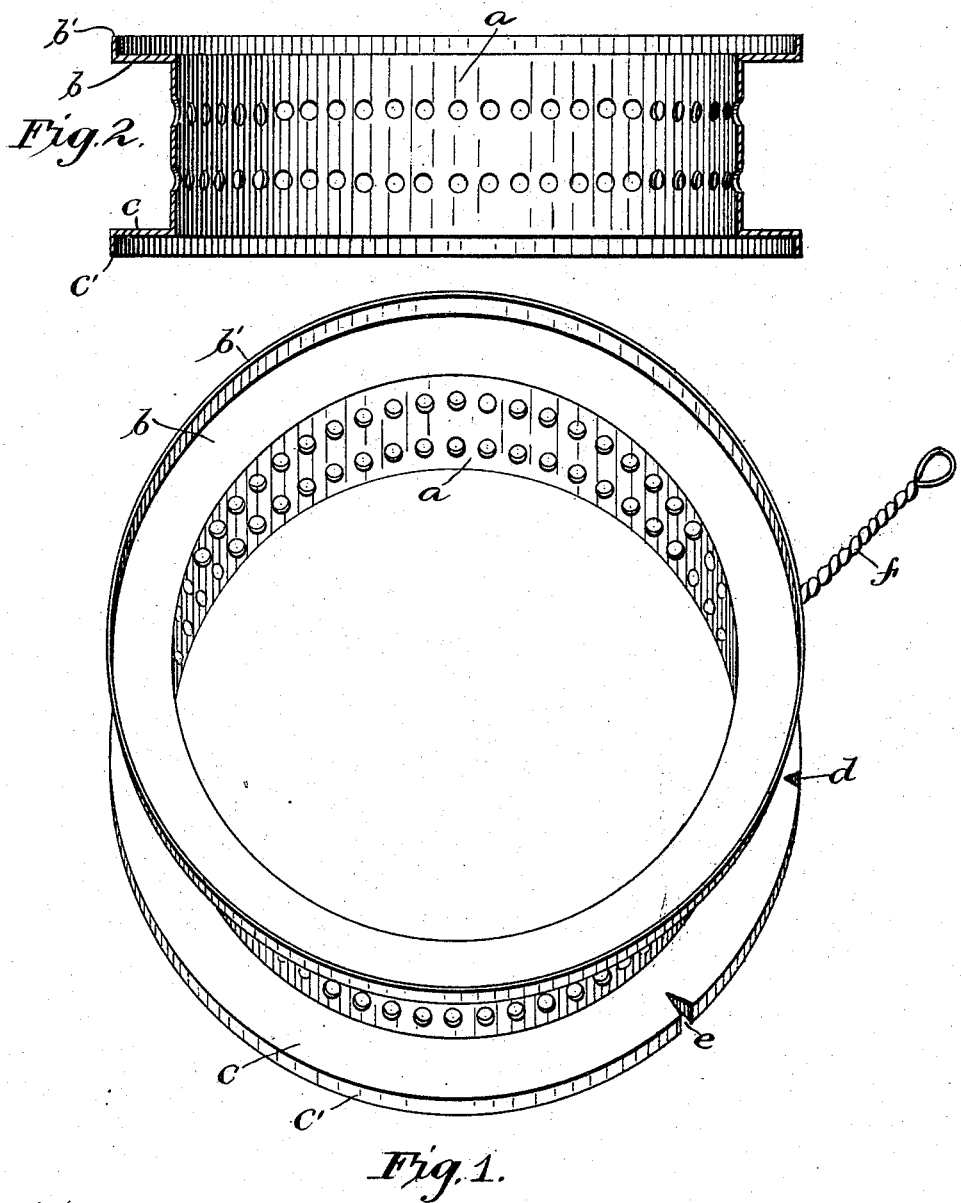

EFFIE MAY PEARSON, OF SAN DIEGO, CALIFORNIA.

STEAM-ESCAPE BAND.

1,202,216. Specification of Letters Patent. Patented Oct. 24, 1916.

Application filed October 18, 1915. Serial No. 56,476.

*To all whom it may concern:*

Be it known that I, EFFIE MAY PEARSON, a citizen of the United States, residing at Chicago, in the county of Cook and State of Illinois, have invented new and useful Improvements in Steam-Escape Bands, of which the following is a specification.

The device which is the subject-matter of the present application for patent is designed for use in connection with frying pans to prevent grease from spattering therefrom, the device being so constructed that it not only serves as a cover for the pan, but also permits the escape of steam.

The invention has for its object to prove a simple and efficient device of the kind stated and one which may be used in connection with frying pans of different sizes.

With the object stated in view, the invention consists in a novel combination and arrangement of parts to be hereinafter described and claimed, and in order that the same may be better understood reference is had to the accompanying drawing forming a part of this specification.

In the drawing, a perspective view of the device is shown.

In carrying out the invention there is provided an upstanding annular shield $a$ formed of sheet metal and having perforations extending entirely around the same. The top of the sheld has a marginal flange $b$ and the bottom has a marginal base flange $c$. The top flange has an up-turned guard rim $b'$, and the base flange $c$ has a down-turned rim $c'$. The device may also be provided with a handle shown at $f$. In the base flange $c$ are edge notches $d$ and $e$ to allow the portion between these notches to be bent upward to give space for the handle of a frying pan, if necessary.

In use, the device is placed on the frying pan, the base flange $c$ resting on the edge of the pan, said edge being located inside the down-turned rim $c'$. On the top flange $b$ the cover of the frying pan will be placed, said cover being located inside the up-turned rim $b'$. The flange $c$ is made wide so that the device may be applied to frying pans of different sizes, and the top flange $b$ is also made wide to accommodate different sized frying pan covers.

When positioned on the frying pan as hereinbefore described, the latter is covered to prevent the grease from spattering out, without, however, preventing the escape of steam from the frying meat, the same escaping freely through the perforations in the wall $a$. The up-turned rim $b'$ serves as a guard to prevent the cover from slipping off the flange $b$, and the down-turned rim $c'$ of the base flange $c$ prevents the device from slipping off the frying pan. The device is very simple, and as all of its parts are readily accessible, it can be easily cleaned and kept in a sanitary condition. The device effectually prevents all escape of grease from the pan. It will be noted that the base flange $c$ seats squarely on the top edge or rim of the pan, and if any grease flies up against the flange it will drop back into the pan and not run off on the outside. Any grease spattering upward inside the wall $a$ is retained by the cover closing the same, in view of which it will not be necessary to give the wall $a$ an excessive height, such as would make the device unwieldy, cumbersome and difficult to handle.

I claim:

An attachment for frying pans comprising an upstanding annular shield open at the top and bottom and having side perforations, and provided with outstanding marginal top and bottom flanges, the top flange having an up-turned rim, and the bottom flange having a down-turned rim.

EFFIE MAY PEARSON.

Witnesses:
RELL S. BUTTON,
P. DOUGLAS BIRD.

Copies of this patent may be obtained for five cents each, by addressing the "Commissioner of Patents, Washington, D. C."